()# United States Patent
Ferrel et al.

(10) Patent No.: US 8,943,035 B2
(45) Date of Patent: Jan. 27, 2015

(54) DISTRIBUTING WEB APPLICATIONS ACROSS A PRE-EXISTING WEB

(76) Inventors: Patrick J. Ferrel, Seattle, WA (US); Kenji Kawai, Seattle, WA (US); Dan Everhart, Edmonds, WA (US); Lynne Evans, Renton, WA (US); Stefan Sigurdsson, Seattle, WA (US); Mike Forrest, Seattle, WA (US)

( * ) Notice: Subject to any disclaimer, the term of this patent is extended or adjusted under 35 U.S.C. 154(b) by 321 days.

(21) Appl. No.: 11/559,859

(22) Filed: Nov. 14, 2006

(65) Prior Publication Data
US 2007/0300160 A1 Dec. 27, 2007

Related U.S. Application Data (60) Provisional application No. 60/736,757, filed on Nov. 14, 2005.

(51) Int. Cl.
G06F 17/30 (2006.01)
H04L 29/08 (2006.01)

(52) U.S. Cl.
CPC .......... *G06F 17/30867* (2013.01); *H04L 67/02* (2013.01)
USPC ........... 707/706; 707/722; 707/723; 707/726; 706/15; 706/16

(58) Field of Classification Search
CPC .......... G06F 17/3087; G06F 17/30554; G06F 17/3089; G06F 17/30696; G06F 17/30864; G06F 17/30884; G06F 9/44
USPC ...................................... 707/1–206
See application file for complete search history.

(56) References Cited

U.S. PATENT DOCUMENTS

| | | | |
|---|---|---|---|
| 5,146,552 A | 9/1992 | Cassoria et al. | |
| 5,760,773 A | 6/1998 | Berman et al. | |
| 5,826,025 A | 10/1998 | Gramlich | |
| 5,870,767 A | 2/1999 | Kraft, IV | |
| 6,119,147 A * | 9/2000 | Toomey et al. | 709/204 |
| 6,279,014 B1 | 8/2001 | Schilit et al. | |
| 6,415,316 B1 * | 7/2002 | Van Der Meer | 709/203 |
| 6,551,357 B1 | 4/2003 | Madduri | |
| 6,563,514 B1 * | 5/2003 | Samar | 715/711 |
| 6,584,479 B2 | 6/2003 | Chang et al. | |
| 6,665,687 B1 * | 12/2003 | Burke | 1/1 |
| 6,683,631 B2 | 1/2004 | Carroll | |
| 6,687,878 B1 | 2/2004 | Eintracht et al. | |
| 6,826,595 B1 * | 11/2004 | Barbash et al. | 709/204 |
| 6,865,713 B1 * | 3/2005 | Bates et al. | 715/233 |

(Continued)

FOREIGN PATENT DOCUMENTS

WO WO 2005/069161 A1 7/2005

OTHER PUBLICATIONS

"Kaboodle," http://www.kaboodle.com/zd/help/getStarted.html, downloaded Apr. 4, 2007, 2 pages.

(Continued)

*Primary Examiner* — Angelica Ruiz
(74) *Attorney, Agent, or Firm* — FSP LLC (57) ABSTRACT

An embodiment is a system and method for a user to organize web content and applications and to share web content and applications with other users. A user may bubble web pages that interest them. The bubbles may be linked or stitched together to form a trail of pages that may not only aid the user to navigate relevant pages, but also be shared with other users.

27 Claims, 8 Drawing Sheets

(56) References Cited

U.S. PATENT DOCUMENTS

| | | | |
|---|---|---|---|
| 6,904,569 B1* | 6/2005 | Anderson | 715/851 |
| 6,920,608 B1* | 7/2005 | Davis | 715/209 |
| 7,233,950 B2* | 6/2007 | Smith, III | 707/10 |
| 7,373,313 B1* | 5/2008 | Kahle et al. | 705/26 |
| 7,454,694 B2* | 11/2008 | Graham | 715/205 |
| 2002/0059343 A1 | 5/2002 | Kurishima et al. | |
| 2002/0116420 A1 | 8/2002 | Allam et al. | |
| 2002/0138582 A1* | 9/2002 | Chandra et al. | 709/206 |
| 2002/0143814 A1 | 10/2002 | Hepworth et al. | |
| 2003/0097410 A1* | 5/2003 | Atkins et al. | 709/206 |
| 2003/0121001 A1 | 6/2003 | Jeannette et al. | |
| 2003/0202009 A1* | 10/2003 | Kasriel | 345/739 |
| 2003/0204490 A1* | 10/2003 | Kasriel | 707/2 |
| 2003/0221167 A1 | 11/2003 | Goldstein et al. | |
| 2004/0003351 A1* | 1/2004 | Sommerer et al. | 715/517 |
| 2004/0019849 A1 | 1/2004 | Weng et al. | |
| 2004/0021686 A1* | 2/2004 | Barberis | 345/738 |
| 2004/0059586 A1* | 3/2004 | Brimberry et al. | 705/1 |
| 2004/0075686 A1* | 4/2004 | Watler et al. | 345/749 |
| 2004/0078757 A1 | 4/2004 | Golovchinsky et al. | |
| 2004/0119742 A1 | 6/2004 | Silbey et al. | |
| 2004/0133601 A1* | 7/2004 | Graham | 707/104.1 |
| 2004/0172594 A1 | 9/2004 | Jones et al. | |
| 2004/0172595 A1 | 9/2004 | Lerner et al. | |
| 2004/0267871 A1* | 12/2004 | Pratley et al. | 709/200 |
| 2005/0055271 A1* | 3/2005 | Axe et al. | 705/14 |
| 2005/0060575 A1* | 3/2005 | Trethewey et al. | 713/201 |
| 2005/0160357 A1* | 7/2005 | Rivette et al. | 715/512 |
| 2005/0177805 A1* | 8/2005 | Lynch et al. | 715/968 |
| 2005/0182773 A1* | 8/2005 | Feinsmith | 707/100 |
| 2005/0193368 A1* | 9/2005 | Becker et al. | 717/106 |
| 2005/0216439 A1* | 9/2005 | Kawakita | 707/1 |
| 2005/0234891 A1 | 10/2005 | Walther et al. | |
| 2006/0004703 A1* | 1/2006 | Spivack et al. | 707/2 |
| 2006/0106847 A1* | 5/2006 | Eckardt et al. | 707/101 |
| 2006/0123107 A1* | 6/2006 | Chen | 709/224 |
| 2006/0259351 A1* | 11/2006 | Yaskin et al. | 705/11 |

OTHER PUBLICATIONS

"PersonalWeb," http://www.personalweb.com/how-it-works.html, downloaded Apr. 4, 2007, 2 pages.

"MyStickies, Sticky Notes for the Web," http://www.mystickies.com/about, downloaded Apr. 4, 2007, 1 page.

"Clipmarks," http://www.clipmarks.com/faq/, downloaded Apr. 4, 2007, 3 pages.

Wikipedia, "del.icio.us," http://en.wikipedia.org/wiki/Del.icio.us, downloaded Dec. 12, 2006, 3 pages.

Wikipedia, "Joshua Schachter," http://en.wikipedia.org/wiki/Joshua_Schachter, downloaded Dec. 12, 2006, 1 page.

"del.icio.us/about,"http://delicio.us/about/, downloaded Dec. 12, 2006, 2 pages.

"Picking Up Where Search Leaves Off," http://www.businessweek.com/print/magazine/content/05_15/b3928112_mz063.htm?chan . . . , downloaded Apr. 10, 2007, 2 pages.

* cited by examiner

DISTRIBUTING WEB APPLICATIONS ACROSS A PRE-EXISTING WEB

RELATED APPLICATIONS

This application claims priority from U.S. Provisional Application No. 60/736,757 filed Nov. 14, 2005, which is hereby incorporated by reference in its entirety.

TECHNICAL FIELD

An embodiment relates to navigating and personalizing the World Wide Web.

BACKGROUND OF THE INVENTION

With billions of unique, publicly accessible World Wide Web (web) pages available and millions more added each day, a web user relies on search engines and bookmarks to navigate and recall relevant topics. A browser or Internet user may also wish to personalize their searches and navigation and share the personalization with other users. Further, applications may aid the browser to more smartly navigate the web to locate topics of interest.

A variety of approaches exist for a web user to search and summarize relevant web pages and to collaborate with other web users. For example, Clipmarks is a user-powered news and knowledge web site. Clipmarks users post interesting bits of information they find on the web to a community web page and the Clipmarks community users determine which bits of information get the most visibility by "popping" their favorites bits to the top of a prioritized community list. Instead of posting links to entire web pages, a clipping tool permits users extract pieces of compelling content from within pages and post those select pieces for everyone to see. For example, only clips that are under 2,000 characters can get on the Clipmarks homepage for other users to view.

Kaboodle allows users to capture anything found on a web page with one mouse click. An information extraction technology summarizes what the user has captured and thereafter allows the user to organize the summaries on a single, separate web page (e.g., available from the Kaboodle home page). The user may also share their Kaboodle page with other users. Users viewing a Kaboodle page may post comments on the page.

Claria PersonalWeb automatically creates a personalized web home page for a user. As the user surfs the web, the user teaches PersonalWeb content in which the user is interested. Based on the accumulated interests, PersonalWeb builds a personalized page containing links to web content related to those interests. The more the user surfs the web, the more knowledge PersonalWeb gains to generate a web home page with links to content relevant to the user.

Del.icio.us is a social bookmarking website that allows users to store their bookmarks online for retrieval from any computer and to add bookmarks from any computer. The bookmarks may be organized with content-based bubbles. Further, the bookmarks may be shared with other users and other users' bookmarks may be searched.

MyStickies is a web based application that allows a user to add virtual sticky notes to any existing web page. When the user returns to the page, the sticky note appears to the user in the location it was created. The sticky notes are all available separately in an account area and can be edited, deleted, and used to link to the web pages where they are posted. The sticky notes may further be tagged with a descriptive category so that the sticky notes (and the pages on which they appear) may be organized by the user according to category.

The present inventors have identified a need for an improved web navigational and personalization scheme.

DETAILED DESCRIPTION OF PREFERRED EMBODIMENTS

Embodiments of a system and method of distributing web applications across a pre-existing web will be described. Reference will now be made in detail to a description of these embodiments as illustrated in the drawings. While the embodiments will be described in connection with these drawings, there is no intent to limit them to drawings disclosed herein. On the contrary, the intent is to cover all alternatives, modifications, and equivalents within the spirit and scope of the described embodiments as defined by the accompanying claims.

Simply stated, an embodiment is a system and method for a user to organize web content and to share web content with other users. A user may place a "bubble" on a web page that interests them. The bubble itself may include content and an application or applications. The bubbles may be linked or stitched together to form a "trail" of pages that may not only aid the user to navigate relevant pages, but also be shared with other users (e.g., friends, family, and colleagues) by way of a special URL that allows a web browser to show the pages with the associated bubbles superimposed thereon. The trail of pages may be published or may be more private depending on the user's privacy settings. Combining the bubbles and the trail of pages allows a user to design a "guided tour" of selected pages of the web with commentary along the way. For example, the guided tour may be used as a presentation. Versus a canned presentation, the guided tour of an embodiment may represent the most current versions of web pages on which the bubbles appear. Further, based on the pages the user bubbles, an embodiment may accumulate information on the user's interests and use the information to suggest which link or links in a web page may be relevant.

Figure 1:
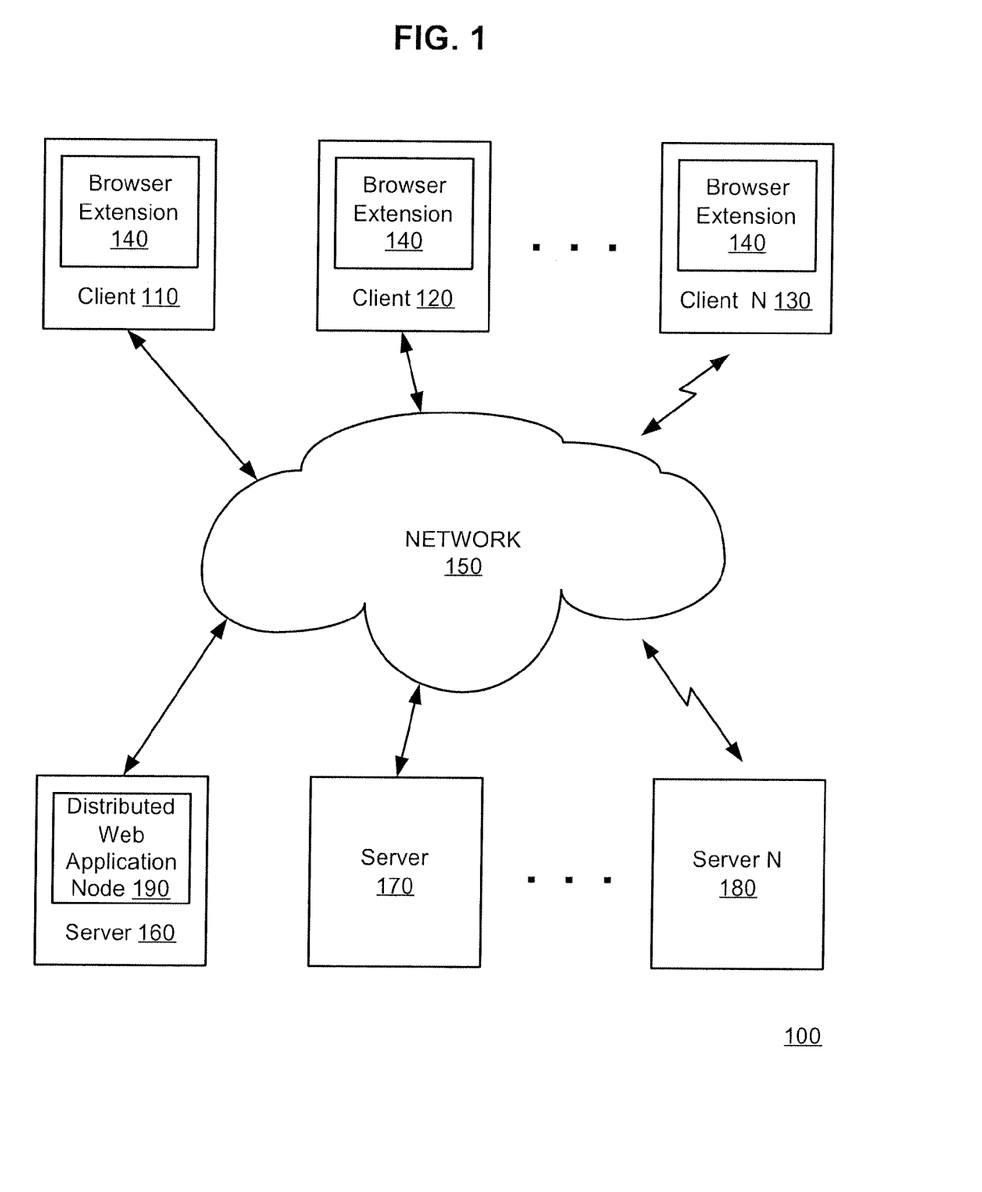
FIG. 1 is a simplified block diagram of a distributed web application system of an embodiment.

FIG. 1 is a block diagram of a distributed web application system 100 of an embodiment. In various embodiments, the distributed web application system 100 may comprise multiple nodes. A node generally may comprise any physical or logical entity for communicating information in the distributed web application system 100 and may be implemented as hardware, software, or any combination thereof. For example, the distributed web application system 100 includes client nodes (e.g., clients 110-130) and server nodes (e.g., servers 160-180). Although FIG. 1 may show a limited number of client and server nodes, it can be appreciated that more or fewer nodes may be employed. Further, each client node 110-130 may include a web browser extension 140 to couple to the distributed web application node 190 of server node 160, the operation of which will be described below.

In general, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), or combination thereof. Further, a node may generally comprise, or be implemented as, software, a software module, an application, a program, a subroutine, an instruction set, or combination thereof. A node may be implemented according to a predefined computer language, manner, or syntax, for instructing a processor to perform a certain function. Examples of a computer language may include C, C++, Java, BASIC, Perl, Matlab, Pascal, Visual BASIC, JavaScript, PHP, SQL, assembly language, machine code, micro-code for a network processor, and so forth. The embodiments are not limited in this regard.

The client nodes (e.g., clients 110-130) and server nodes (e.g., servers 160-180) of the distributed web application system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

The distributed web application system 100 may communicate information in accordance with one or more standards, such as standards promulgated by the IEEE, the Internet Engineering Task Force (IETF), the International Telecommunications Union (ITU), and so forth. In various embodiments, the distributed web application system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The distributed web application system 100 may include one or more nodes (e.g., client nodes 110-130 and server nodes 160-180) arranged to communicate information over one or more wired and/or wireless communications media. In wireless implementations, the nodes of the system 100 may include components and interfaces suitable for communicating information signals over the designated wireless spectrum, such as one or more transmitters, receivers, transceivers, amplifiers, filters, control logic, antennas and so forth.

Figure 2:
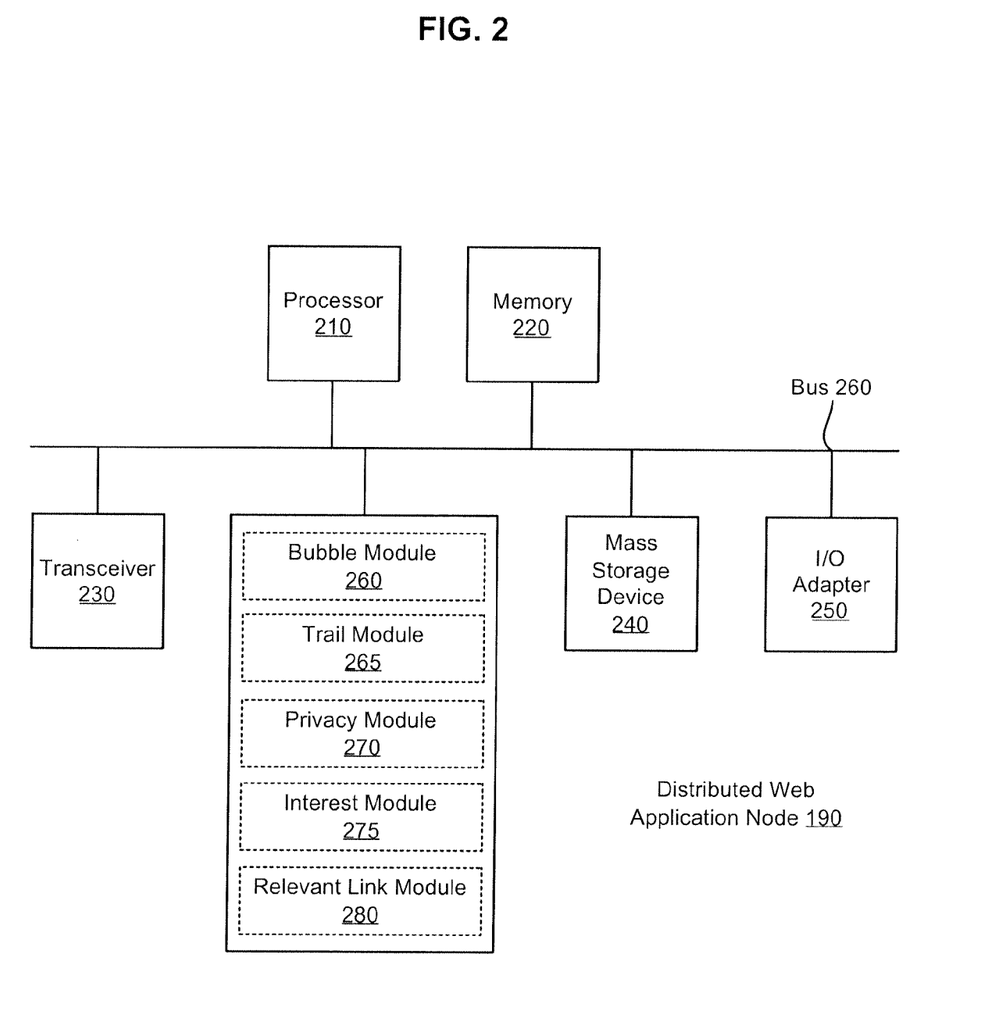
FIG. 2 is a simplified block diagram of a distributed web application node of an embodiment.

FIG. 2 more specifically illustrates distributed web application node 190 of distributed web application system 100. As shown in FIG. 2, the distributed web application node 190 may comprise multiple elements such as a processor 210, memory 220, transceiver 230, mass storage device 240, and I/O adapter 250 coupled to a bus 260. The distributed web application node 190 further includes a bubble module 260, a trail module 265, a privacy module 270, an interest module 275, and a relevant link module 280. Some elements of distributed web application node 190 may be implemented using, for example, one or more circuits, components, registers, processors, software subroutines, or any combination thereof. Although FIG. 2 shows a limited number of elements, it can be appreciated that additional or fewer elements may be used by distributed web application node 190 as desired for a given implementation. The embodiments are not limited in this regard.

As noted, in an embodiment, distributed web application node 190 may include a processor 210. Processor 210 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. Processor 210 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments are not limited in this context. In an embodiment, processor 210 may include, or have access to, memory 220.

The distributed web application node 190 may be arranged to communicate information over network 150 with other nodes, such as server nodes 170 and 180 and client nodes 110-130. The information may be communicated in the form of packets over the network 150, with each packet comprising media information and/or control information. A packet in this context may refer to any discrete set of information, including a unit, frame, cell, segment, fragment, and so forth. The packet may be of any size suitable for a given implementation. The embodiments are not limited in this regard.

The distributed web application node 190 of an embodiment may be configured to organize and share web content and applications among users coupled to the distributed web application node 190. As noted, the distributed web application node 190 may include a bubble module 260, a trail module 265, a privacy module 270, an interest module 275, and a relevant link module 280. The function of the modules 260-280 will be discussed in turn.

As introduced, an embodiment enables a user to create and place bubbles on existing web pages. As used herein, a bubble may be a mark, annotation, symbol, or similar visual indication that corresponds to and appears on a web page. In an embodiment, the bubble corresponds to and appears on a particular portion or region of the web page. Further, the bubble may include a pointer to point specifically to the portion of the web page to which the bubble corresponds. The client nodes 110-130 including the distributed web application browser extension 140 may communicate over the network 150 with the distributed web application node 190. The bubble module 260 of distributed web application node 190 enables a user to create and place a bubble on an existing web page (i.e., to bubble the existing web page) and to relate links, comments, applications, and other content to the bubble if desired. The bubble module 260 may superimpose a bubble on the existing web page wherever the user desires. In an embodiment, the bubble expands when selected or the user hovers over the bubble (e.g., with their mouse cursor). The expanded bubble, also referred to as a tooltip, displays the user's links, comments, applications, and other content, if any. Within the expanded bubble, the user may select the name of the trail (e.g., a user may have more than one trail and may organize and link bubbles into different trails based on the trail name), and the name of the bubble. The user may thereafter save the bubble, cancel the bubble, erase the bubble altogether, and the like.

In an embodiment, the trail module 265 links or stitches the bubbles together such that the bubbles may be used sequentially to navigate through the web pages on which the user has generated a bubbles. For example, each bubble the user creates is automatically linked to the bubble immediately proceeding it (other than for the first bubble) and vice versa to create a sequential trail of bubbles with a beginning and an end. In an alternate embodiment, the most recent bubble that the user creates may also link to the first bubble that the user created such that the bubbles are all linked in a trail that loops back to its beginning. The links are activated by the user clicking a forward arrow and a backward arrow included in the expanded bubble or tooltip as will be explained in more detail with reference to FIG. 6.

Once the user has created bubbles, the privacy module 270 of an embodiment may be used to determine to what extent the bubbles (and the content and application or applications contained therein, if any) may be viewed by other users coupled to the distributed web application node 190. For example, the user may maintain one or more of their bubble trails in private such that they are the only user to whom the bubbles are displayed. The user may also select another user or group of users to whom the bubbles will be visible (e.g., limited privacy). Finally, the user may publish the bubbles such that the bubbles are visible to anyone coupled to the distributed web application node 190 (e.g., client nodes 110-130 including distributed web application browser extension 140). In an embodiment, the user may maintain privacy settings individually for trails (e.g., as determined my their trail name).

Each time the user creates a bubble on a web page, an interest module 275 tracks terms on the web page to determine the user's interests. For example, if the user bubbles a web page, the interest module 275 extracts terms from the page and filters the terms to remove extraneous terms. In an embodiment, the interest module 275 filters the terms to remove HTML markup terms and unimportant words (e.g., words that do not add to understanding the meaning of the page such as "the," "and," "a," etc.) to recover salient terms relating to the content of the web page. Once the terms have been extracted from the web page, the interest module 275 weights each term based on their frequency of occurrence within the web page. Once the interest module 275 weights the filtered terms, it assembles the terms into a term vector. For example, the term vector may be a table including terms and the number of occurrences of the terms for a given context (e.g., page, trail of pages, etc.) The term vector may further be a one-dimensional list of terms in rank order according to their weight.

As the user bubbles additional web pages, the interest module 275 continues to collect information reflecting the user's interests. For example, for each page the user bubbles, the interest module 275 constructs a term vector. In an embodiment, the term vectors for each bubbled page may be combined into a cumulative term vector associate with the term or terms of the bubble name and/or trail name of the new bubble. In another embodiment, the term vectors for each bubbled page may be combined into a cumulative term vector for the user independent of the bubble name and/or trail name.

In an embodiment, if a user places multiple bubbles on the same page, the term vector is generated and merged with the cumulative term vector only once.

In an embodiment, the terms that are assembled into the cumulative term vector are self-defining. For example, a bubble may include a bubble name and/or a trail name. As the user bubbles multiple pages and includes the same bubble name or trail name, the interest module 275 associates the bubble name or trail name with the cumulative term vector for that trail. For example, a user may bubble a page about the Seattle Seahawks football team and name the bubble or name the trail "football." If the user thereafter bubbles a web page about Shaun Alexander and names the bubble or names the trail "football" also, then the term vectors for each page may be further associated with the trail or interest named "football." In this manner, the user may establish a definition for an interest by bubbling related pages in a single trail.

The term vectors generated by the interest module 275 may also be employed by the relevant link module 280 to generate hints or suggestions as to the relevancy of links contained on a web page. For example, when user visits a web page, the relevant link module 280 may extract the links contained in the web page. The relevant link module 280 may search the link destination web pages (i.e., the web pages to which the links point) for terms contained in the cumulative term vector representing the user's interests. In an embodiment, the relevant link module 280 may utilize a commercial search engine to search for the cumulative term vector terms in the link destination web pages. If, based on the search, one or more of the link destination web pages is relevant (e.g., contains one or more terms from the cumulative term vector, and in an embodiment ranked by the commercial search engine), the relevant link module 280 may generate, for example, a flag next to the link to notify the user of the relevance of the link to the user's interests while the user is viewing the web page. Further, as will be explained in greater detail with respect to FIG. 8, the relevant link module 280 may further extract all the links on each link destination page, and so on, to aid the user's efficient navigation to the relevant link destination web sites.

Figure 3:
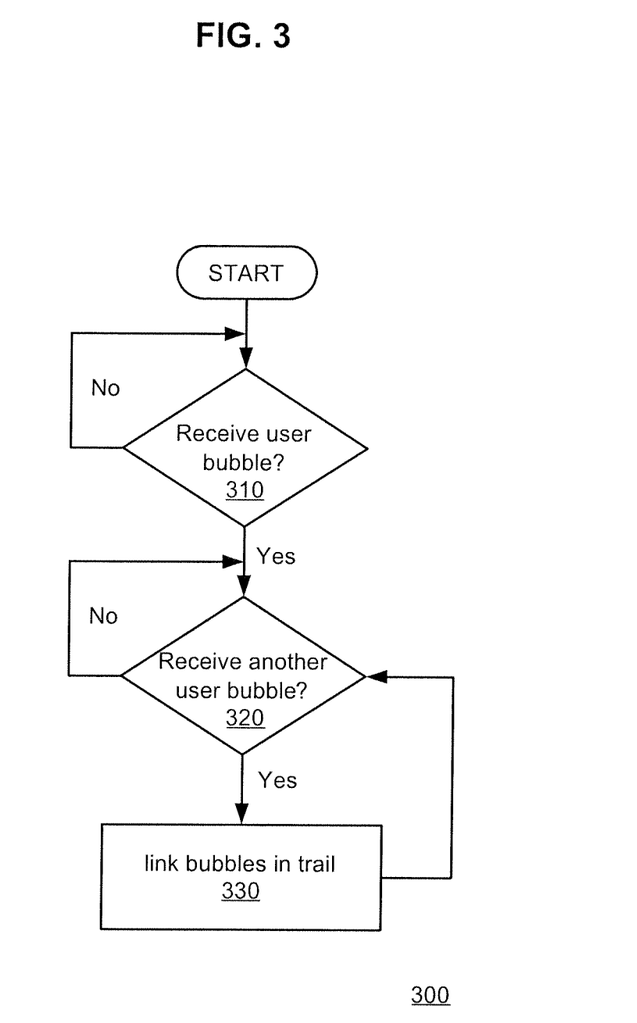
FIG. 3 is a simplified process flow of an embodiment to bubble and link web pages.

FIG. 3 is a process flow 300 of an embodiment for a user to bubble and link web pages. A user first connects to the distributed web application node 190 by opening a web browser on client 110 that includes the distributed web application browser extension 140. At 310, the distributed web application node 190 receives an indication that a user has bubbled a first web page. At 320, the distributed web application node 190 receives an indication that a user has bubbled a second web page. Each bubble may include a bubble name, a trail name to organize groups of bubbles in separate trails, links, comments, applications, and other content. Once the user has created at least two bubbles, at 330 the distributed web application node 190 links the bubbles in a trail according to their trail name. For example, each bubble of a trail may further include a link to the bubble that precedes (other than for the first bubble) and a link in the trail and to the bubble that follows (other than for the last bubble). The result is a sequential trail of bubbles with a beginning and an end. In an alternate embodiment, the most recent bubble in a trail may include a link back to the first bubble in the trail such that the trail of bubbles becomes a closed loop.

Figure 4:
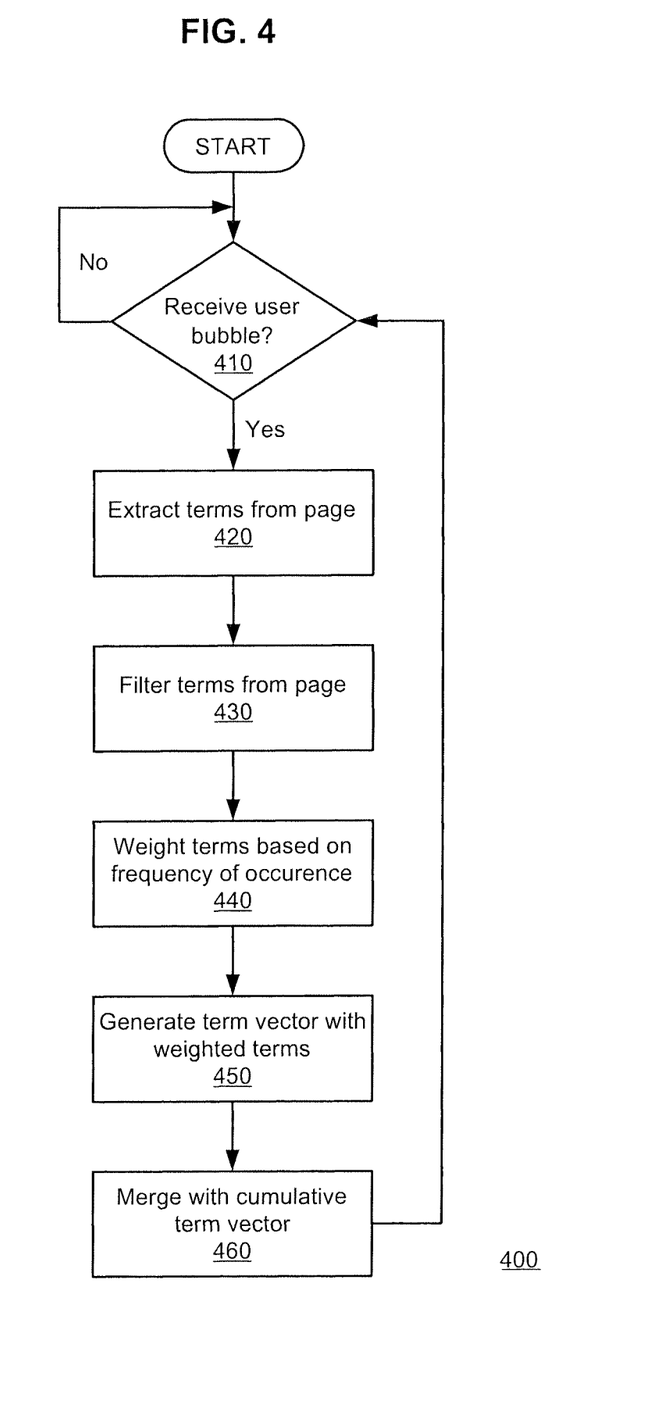
FIG. 4 is a simplified process flow of an embodiment to determine a user's interests.

FIG. 4 is a process flow 400 of an embodiment to determine a user's interests. A user first connects to the distributed web application node 190 by opening a web browser on client 110 that includes the distributed web application browser extension 140. At 410, the distributed web application node 190 receives an indication that a user has bubbled a web page. At 420, once the user has bubbled the page, the distributed web application node 190 extracts terms from the web page (e.g., from the web page source code). At 430, the distributed web application node 190 filters the terms to remove HTML markup and unimportant terms. At 440, the distributed web application node 190 weights the filtered terms based on their frequency of occurrence within the web page. Thereafter, at 450 the distributed web application node 190 generates a term vector with the weighted terms. At 460, the distributed web application node 190 merges the term vector of the page with a cumulative term vector. In an embodiment, the cumulative term vector relates to the term or terms of a bubble name and/or trail name. In another embodiment, the cumulative term vector may relate to the user independent of the bubble title and/or trail name. As the process flow 400 of an embodiment repeats every time a user bubbles a web page, the cumulative term vector evolves as additional term vectors for individual pages are merged. The user's interests may be inferred from the most heavily weighted terms in the cumulative term vector.

Figure 5:
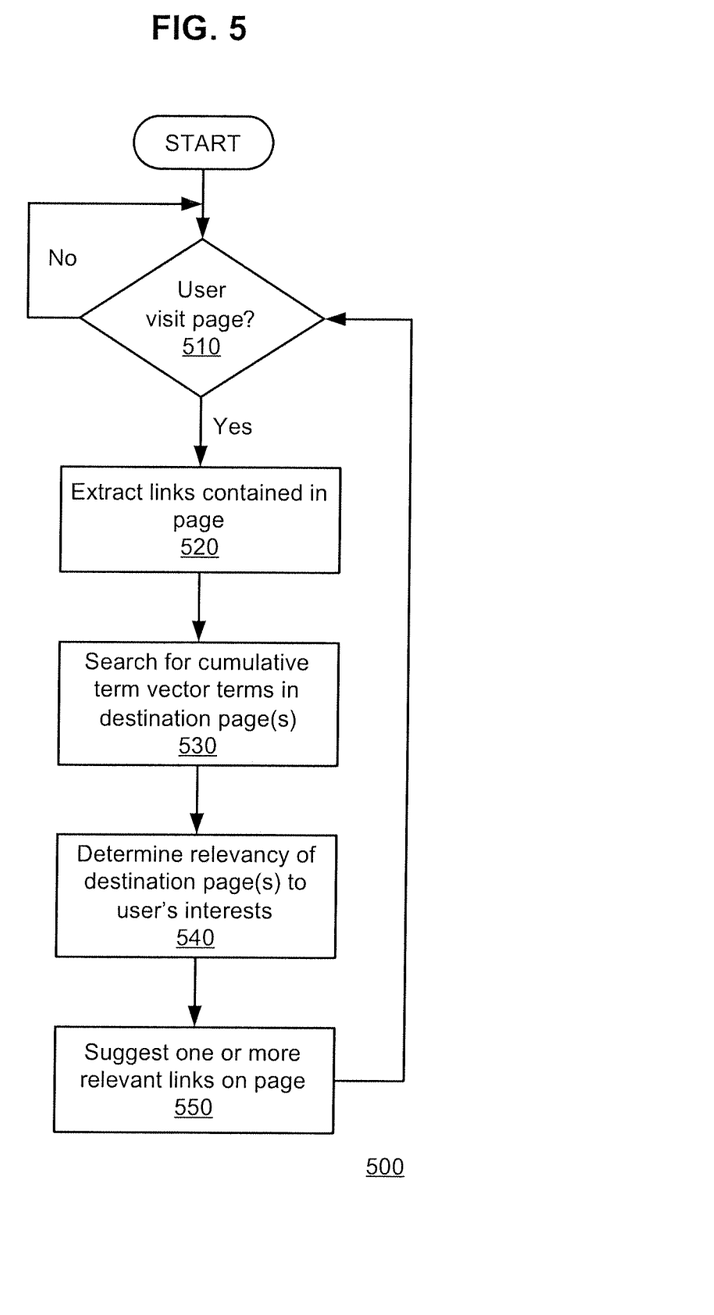
FIG. 5 is a simplified process flow of an embodiment to suggest one or more relevant links based on the user's interests.

FIG. 5 is a process flow 500 of an embodiment to suggest one or more relevant links based on the user's interests. A user first connects to the distributed web application node 190 by opening a web browser on client 110 that includes the distributed web application browser extension 140. At 510, the distributed web application node 190 receives an indication that the user has visited a web page. At 520, the distributed web application node 190 extracts links contained within the visited web page (e.g., to other web pages). At 530, the distributed web application node 190 searches the link destination web pages (i.e., web pages to which the links point) for terms contained in the cumulative term vector representing the user's interests. In an embodiment, the relevant link module 280 may utilize a commercial search engine to search for the cumulative term vector terms in the link destination web pages. At 540, the distributed web application node 190 determines whether one or more of the link destination web pages is relevant (e.g., contains one or more terms from the cumulative term vector). At 550, the distributed web application node 190 suggests those links that are relevant to the user, in an embodiment by generating a flag adjacent to the relevant link or links. The flag may also contain its own link to the relevant page.

Although the process flows of FIG. 3 through FIG. 5 have been described with respect to the distributed web application node 190, in various embodiments, one or more of the functions or process steps corresponding to the distributed web application node 190 may alternatively be performed by the browser extension 140. In an embodiment, all of the functions or process steps corresponding to the distributed web application node 190 may be performed by the browser extension 140. Further, one or more of the functions or process steps corresponding to the distributed web application node 190 may alternatively be distributed among multiple distributed web application nodes 190.

Figure 6:
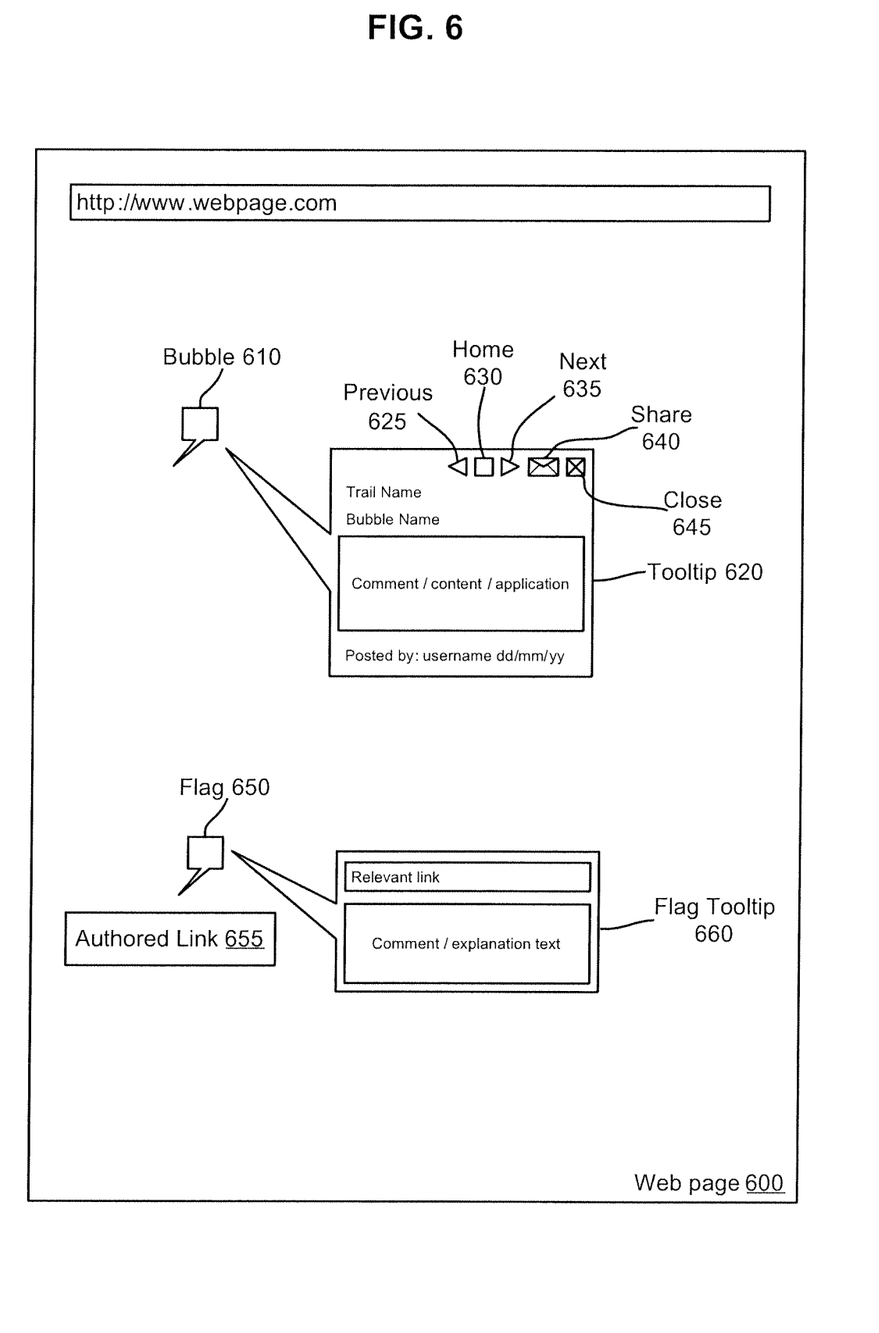
FIG. 6 illustrates a web page including a bubble and a relevant link.

FIG. 6 illustrates an existing web page 600 including a bubble and a relevant link generated by the modules and processes introduced above. Existing web page content has been omitted for clarity. When a user adds a bubble to existing web page 600, a bubble 610 appears. When the user selects or hovers over (e.g., with a mouse cursor) the bubble 610, a tooltip 620 expands from the bubble 610. Tooltip 620 is an example of an interactive graphical user interface (GUI) associated with bubble 610. Upon initial bubble 610 creation, the tooltip 620 allows the user create a bubble name and to determine to which trail (if they wish to author more than one) the bubble 610 will be added. The user may also insert links, comments, applications, and other content into the bubble 610 after which the user may save the bubble 610. Once the bubble 610 has been created, when the bubble 610 is selected or hovered over by, for example, a mouse cursor, tooltip 620 reappears as illustrated in FIG. 6. For example, the tooltip 620 may include the trail name, the title of the bubble 610, links, comments, applications, and other content, and the user name of the creator. The tooltip 620 of an embodiment may also include links or buttons for a variety of tasks. For example, previous button 625 links to the previous bubble in the trail and to the web page on which it appears. Next button 635 links to the next bubble in the trail and to the web page on which it appears. Home button 630 will link to a bubble that the user may specify as home, such as a logical starting point for a trail that may or may not be the first bubble the user created in time. The share button 640 allows the user to share the trail with other users by generating a link to the trail that may be communicated to other users. The close button 645 closes the tooltip 620 until the user again selects or hovers over the bubble 610.

Figure 7:
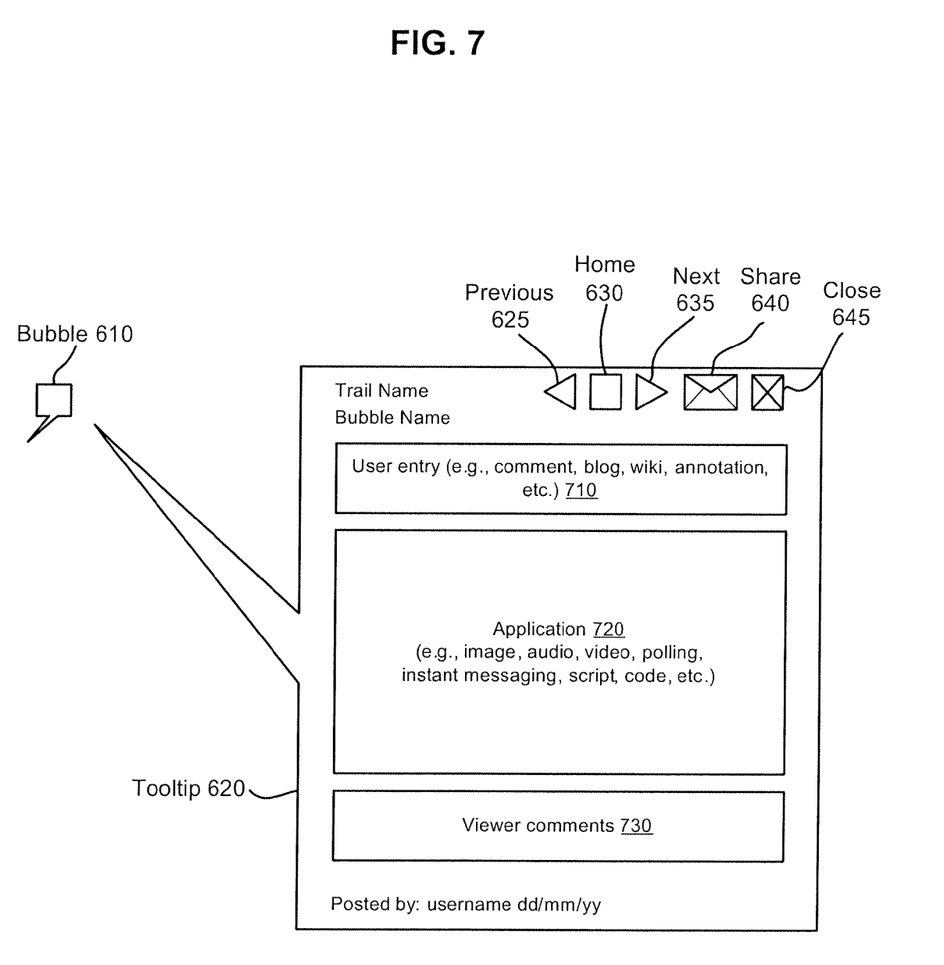
FIG. 7 illustrates detail of the bubble of FIG. 6 including an application and viewer comments.

FIG. 7. illustrates additional detail of existing web page 600, bubble 610, and tooltip 620. As noted. In an embodiment, a user may insert links, comments, applications, and other content into the bubble. The combination of the links, comments, applications, and other content allows the user to personalize and add function to the bubble. For example, in addition to the features introduced with respect to FIG. 6 to create the bubble 610 platform or environment, the tooltip 620 (i.e., expanded bubble 610) may include a user entry 710. The user entry may be text, for example a blog entry, a comment, part of an online collaboration or "wiki." Another user coupled to the distributed web application node 190 and viewing bubble 610 may further add viewer comments 730 to the tooltip 620 to comment on the user entry 710 or other content included in the tooltip 620. In an embodiment, multiple users may add viewer comments 730.

In addition to text entry, the user may add additional content in the tooltip 620. For example, a user may add an image, audio, video, and the like. The user may also add an application 720 to the tooltip 620. The application 720 may include any applications that display the content introduced above (e.g., the application 720 may be an audio player or a video player). Application 720 may further include applications such as polling applications, instant messaging applications, or any other applications that may operate within web pages. Additionally, application 720 may include a script or code (e.g., any of the various HTML embedding technologies including embed, script, iframe, object, and other HTML tags) to perform any function supported by the script or code. The application 720 may comprise client code and server code in any mix. For example, a bubble application may show a list of links derived from a search engine search. This may be performed by code in a script tag written in JavaScript and executed on a commercial search engine server written in any combination of server languages (e.g., Java, PHP, C, C++, etc.). In an embodiment, any script or code that may be executed by a web browser for a web page may also be included for execution as application 720. Accordingly, in an embodiment, the tooltip 620 of an embodiment may be utilized by a user to add a vast variety of functionality by adding custom scripts or codes of their own or other third-party design. In an embodiment, the content and one or more applications 720 may be hosted. For example, the application 720 may point to a video and video viewer hosted by a third party. Alternatively, some or all of the content and content and one or more applications 720 may be hosted by the distributed web application module 190. Tooltip 620, including user entry 710, application 720, and viewer comments 730 allow the creation, modification, and distribution of myriad content on any existing web page.

FIG. 6 further illustrates that existing web page 600 may also include a flag 650 generated by the relevant link module 280 that appears adjacent to an authored link 655 (e.g., a link that is included as part of the existing web page 600). The flag 650 indicates that the authored link 655 may be relevant to the user's interest. When the flag is selected or hovered over, a flag tooltip 660 expands to display the address of the relevant link and a comment/explanation as to why the link is relevant (e.g., by including the terms that, when compared with the cumulative term vector for the user, triggered the relevancy of the link). The user may select the link adjacent to the flag 650 to navigate to the relevant page.

Figure 8:
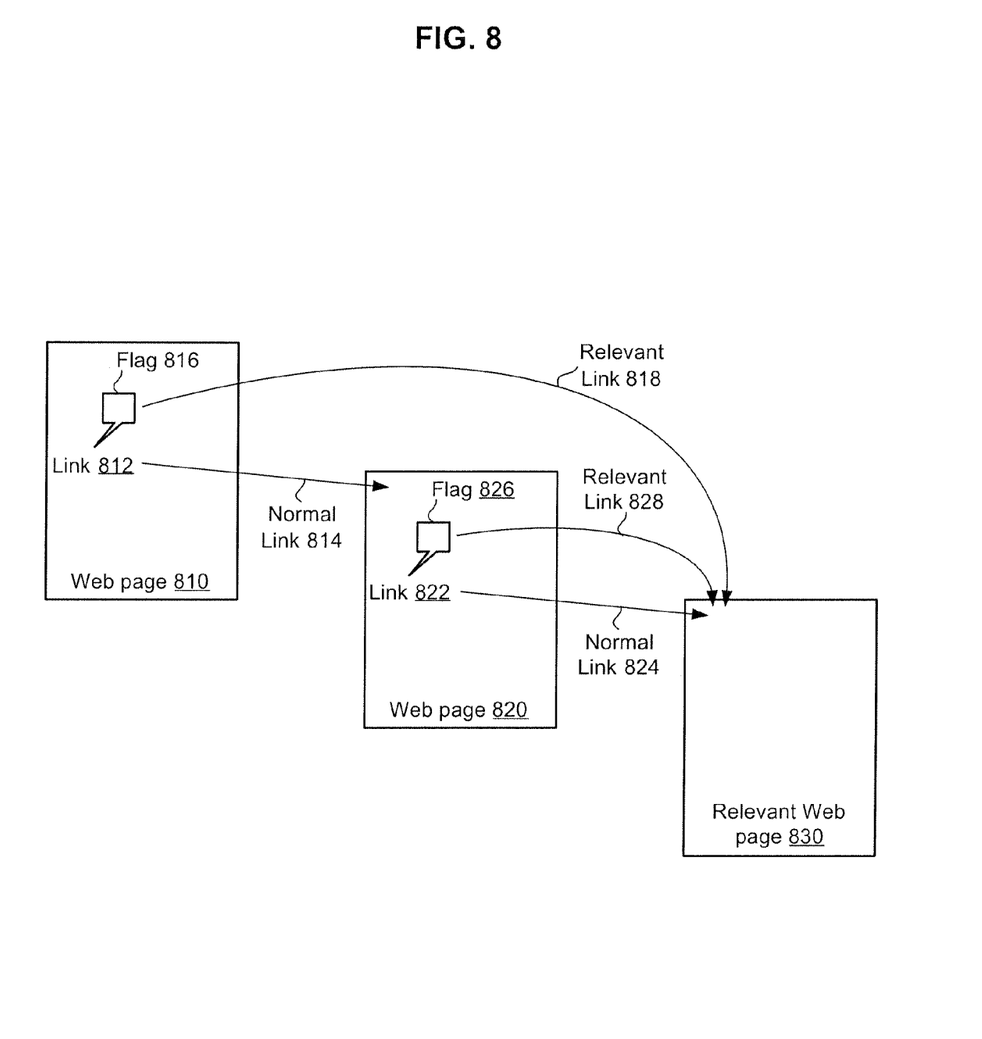
FIG. 8 illustrates a relevant link linking directly to a relevant web page.

FIG. 8 illustrates that in an embodiment, the relevant link flag may also itself be a link to a relevant page. For example, existing web page 810 may contain a link 812 (e.g., referenced with an HTML href). The destination of the link 812, existing web page 820, is examined for its relevancy to the user's interests as assembled in the cumulative term vector. In an embodiment, the destination of link 822 in existing web page 820 (e.g., existing web page 830) will also be examined for relevancy to the user's interests and so on. As illustrated, existing web page 830 is relevant to the user's interest. As a result, the path of links that lead to the relevant existing web page 830 are flagged so that, for example, the user may link to the relevant existing web page 830 by selecting the flagged links 812 and 822 and following normal links 814 and 824 respectively. However, in an embodiment, once relevant existing web page 830 is located by analyzing links, links of links, etc., the flags suggesting the links to follow may themselves link directly to the relevant existing web page 830. Accordingly, flags 816 and 826 not only suggest links 812 and 822 respectively to locate the relevant web page 830, but also directly link, via relevant links 818 and 828 respectively, to the relevant existing web page 830 so that the user may bypass any intermediate pages. Though illustrated with two layers of link relevancy determinations, it is to be understood that more layers of links may be examined. In an embodiment, the extraction of terms related to the link destinations may be limited to the domain to which each link points. For such an example, if all the links of an existing web page and its progeny point to web pages of the same domain, only that domain is searched.

It will be obvious to those having skill in the art that many changes may be made to the details of the above-described embodiments without departing from the underlying principles of the invention. The scope of the present invention should, therefore, be determined only by the following claims.

The invention claimed is:

1. A distributed web application node comprising:
 a bubble module operable to receive indications that a user bubbled a plurality of different web pages, wherein each bubble is associated with a respective web page and comprises bubble content that is not part of the respective web page nor linked to by the respective web page, each bubble comprising a pointer to a specific location on the respective web page, each bubble further comprising content that appears within a bubble boundary at the specific location on the web page;
 a trail module operable to link a plurality of bubbles into a trail, wherein each bubble in the trail comprises one or more links to other bubbles in the trail and each bubble in a subset of the plurality of bubbles comprises a link to a next bubble in the trail and a link to a previous bubble in the trail and wherein the links are configured to navigate a browser to the web page associated with the linked bubble and to form a display of both the web page associated with the linked bubble and the linked bubble together at the same time; and
 a privacy module operable to determine the visibility of the bubbles according to visibility settings provided by the user.

2. The distributed web application node of claim 1, wherein a bubble comprises a bubble application comprising at least one of an audio player, a video player, a polling application, a messaging application, an executable script, and executable code, or a combination thereof.

3. The distributed web application node of claim 1, the bubble content further comprising at least one of a bubble name, a trail name, a blog entry, a wiki entry, a user comment, a viewer comment, or a combination thereof.

4. The distributed web application node of claim 1, further comprising:
 an interest module operable to extract a plurality of terms from the web pages associated with each of the plurality of bubbles in a trail, and to determine a set of relevant terms therefrom; and
 a relevant link module operable to extract one or more links in a web page displayed in a browser, search the destination web pages of the links for the relevant terms, and to identify one or more of the links as relevant based on the search.

5. The distributed web application node of claim 1, the trail module operable to further:
 generate a linked list of the bubbles in the trail to enable a user to navigate to the web pages associated with the bubbles in the trail.

6. The distributed web application node of claim 1 further comprising:
 an interest module operable to determine a user's interests, in response to receiving an indication that the user bubbled a web page, the interest module operable to extract a plurality of terms from the web page;
 filter the terms to remove HTML markup and unimportant words;
 weight the filtered terms by their frequency of occurrence in the web page;
 generate a term vector including the weighted terms; and
 merge the term vector with a cumulative term vector for the trail.

7. The distributed web application node of claim 3 further comprising: a relevant link module operable to generate one or more relevant links on the web page based on the user's interests, the relevant link module operable to identify links on the web page, each link pointing to a corresponding destination web page; search for cumulative term vector terms in the destination web pages;
 determine the relevancy of the destination web pages to the user's interests based on the search results; and
 suggest one or more relevant links to the user.

8. The distributed web application node of claim 1, the privacy module operable to determine the visibility of the bubbles based on a privacy setting, the privacy setting to include private, to display the bubbles only to the user;
 public, to display the bubbles to any user coupled to the distributed web application node; and
 limited, to display the bubbles to a predetermined group of users coupled to the distributed web application node.

9. A method comprising:
  receiving, from a user coupled to a distributed web application node, indication of a first bubble on a first web page, the first bubble including content and associated with the first web page;
  receiving, from the user, indication of a second bubble on a different, second web page, the second bubble including content and associated with the second web page;
  receiving from the user, indication of a third bubble on a different, third web page, the third bubble including content and associated with the third web page, each bubble not part of the associated web page nor linked to by the associated web page, each bubble comprising a pointer to a specific location on the associated web page, each bubble further comprising content that appears within a bubble boundary at the specific location on the associated web page; and
  linking the first bubbler the second bubble, and the third bubble to generate a trail of bubbles, wherein linking comprises placing a link in the first bubble to the second bubble and a link in the second bubble to the first bubble and the third bubble, wherein the links are configured to navigate a browser to the web page associated with the corresponding bubble and to display together at the same time the web page and the bubble.

10. The method of claim 9, wherein the first bubble comprises a bubble application comprising at least one of an audio player, a video player, a polling application, a messaging application, an executable script, and executable code, or a combination thereof.

11. The method of claim 9, the bubble content further comprising at least one of a bubble name, a trail name, a blog entry, a wiki entry, a user comment, a viewer comment, or a combination thereof.

12. The method of claim 9 further comprising:
  extracting, from the first web page and the second web page, a plurality of terms;
  filtering the terms extracted from the first web page and the second web page to remove HTML markup and unimportant words;
  weighting the filtered terms based on their frequency of occurrence in the first web page and the second web page;
  generating a first term vector corresponding to the weighted terms extracted from the first web page;
  generating a second term vector corresponding to the weighted terms extracted from the second web page; and
  merging the first term vector with the second term vector to generate a cumulative term vector.

13. The method of claim 12 further comprising identifying the user's interests based on the weighted terms of the cumulative term vector.

14. The method according to claim 13 further comprising:
  extracting, from a web page, links contained in the web page, each link to point to a corresponding destination web page;
  searching for cumulative term vector terms in the destination web pages;
  determining a relevancy of the destination web pages to the user's interests based on the results of the search; and
  suggesting one or more relevant links to the user.

15. The method of claim 9 further comprising:
  detecting a user provided privacy setting for a selected bubble;
  displaying the selected bubble to only the user if the privacy setting is private;
  displaying the selected bubble to any user coupled to the distributed web application node if the privacy setting is public; and
  displaying the selected bubble to a predetermined group of users coupled to the distributed web application module if the privacy setting is limited.

16. An article comprising a computer-readable storage medium containing instructions to cause a system to:
  receive, from a user coupled to the system, indication of a plurality of bubbles on a plurality of different, existing web pages, wherein each of the bubbles is associated with a respective web page, each bubble not part of the respective web page nor linked to by the respective web page, each bubble comprising a pointer to a specific location on the respective web page, each bubble further comprising content that appears within a bubble boundary at the specific location on the respective web page and wherein one or more of the bubbles includes an application, the application to include at least one of an audio player, a video player, a polling application, a messaging application, an executable script, and executable code, or a combination thereof;
  link the plurality of bubbles into a trail, wherein each bubble in the trail comprises one or more links to other bubbles in the trail and each bubble in a subset of the plurality of bubbles comprises a link to a next bubble in the trail and a link to a previous bubble in the trail, and wherein the links are configured to navigate a browser to the web page associated with the linked bubble and to display at the same time the web page and the linked bubble;
  display a bubble on one of the plurality of existing web pages based on a privacy setting provided by the user; and
  execute the application within the displayed bubble.

17. The article of claim 16, the executable instructions to cause the system to:
  extract, from a plurality of web pages in the trail, a plurality of terms;
  filter the extracted terms to remove HTML markup and unimportant words;
  weight the filtered terms based on their frequency of occurrence in the first web page; and
  merge the weighted terms extracted from the plurality of web pages in the trail into a cumulative term vector.

18. The article of claim 17, the executable instructions to cause the system to:
  extract, from a web page, links contained in the web page, each link pointing to a corresponding destination web page;
  search for cumulative term vector terms in the destination web pages;
  determine a relevancy of the destination web pages to the user's interests based on the results of the search; and
  suggest one or more relevant links to the user.

19. The article of claim 16, the executable instructions to cause the system to:
  display the first bubble and the second bubble to only the user if the privacy setting is private;
  display the first bubble and the second bubble to any user coupled to the system if the privacy setting is public; and
  display the first bubble and the second bubble to a predetermined group of users coupled to the system if the privacy setting is limited.

20. A distributed web application system comprising:
  a bubble module operable to receive indications that a user bubbled a plurality of different web pages, wherein each bubble is associated with a respective web page and comprises bubble content each bubble not part of the respective web page nor linked to by the respective web page, each bubble comprising a pointer to a specific location on the respective web page, each bubble further comprising content that appears within a bubble boundary at the specific location on the web page;

a trail module operable to link a plurality of bubbles into a trail, wherein each bubble in the trail comprises one or more links to other bubbles in the trail and each bubble in a subset of the plurality of bubbles comprises a link to a next bubble in the trail and a link to a previous bubble in the trail, and wherein the links are configured to navigate a browser to the web page associated with the linked bubble and to display at the same time the web page and the linked bubble;

an interest module operable to extract a plurality of terms from the web pages associated with each of the plurality of web pages in the trail, and to determine a set of relevant terms therefrom; and a relevant link module operable to extract one or more links in a web page displayed in a browser, search the destination web pages of the links for the relevant terms, and to identify one or more of the links as relevant based on the search.

21. The distributed web application system of claim 20, the bubble content comprising an application comprising at least one of an audio player, a video player, a polling application, a messaging application, an executable script, and executable code, or a combination thereof.

22. The distributed web application system of claim 20, further comprising a distributed web application browser extension to receive bubble content from the user, a client, a distributed web application node, a third party, or a combination thereof.

23. The distributed web application node of claim 22, the bubble content further comprising at least one of a bubble name, a trail name, a blog entry, a wiki entry, a user comment, a viewer comment, or a combination thereof.

24. The distributed web application node of claim 1, wherein each of the plurality of bubbles in the trail comprises a link to a next bubble in the trail and a link to a previous bubble in the trail.

25. The method of claim 9, further comprising linking the third bubble to the second bubble and the first bubble.

26. the method of claim 9, further comprising linking the first bubble to the third bubble.

27. The computer-readable storage medium of claim 16, wherein each of the plurality of bubbles in the trail comprises a link to a next bubble in the trail and a link to a previous bubble in the trail.

* * * * *